US011942229B2

(12) United States Patent
Gramlich

(10) Patent No.: US 11,942,229 B2
(45) Date of Patent: Mar. 26, 2024

(54) MOLTEN METAL FUEL BUFFER IN FISSION REACTOR AND METHOD OF MANUFACTURE

(71) Applicant: BWXT Advanced Technologies LLC, Lynchburg, VA (US)

(72) Inventor: Craig D. Gramlich, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 636 days.

(21) Appl. No.: 16/851,142

(22) Filed: Apr. 17, 2020

(65) Prior Publication Data

US 2020/0373024 A1 Nov. 26, 2020

Related U.S. Application Data

(60) Provisional application No. 62/836,103, filed on Apr. 19, 2019.

(51) Int. Cl.
*G21C 3/16* (2006.01)
*G21C 3/22* (2006.01)
*G21C 21/00* (2006.01)
*G21C 3/04* (2006.01)

(52) U.S. Cl.
CPC .............. *G21C 3/22* (2013.01); *G21C 21/00* (2013.01); *G21C 3/04* (2013.01); *G21C 3/16* (2013.01)

(58) Field of Classification Search
CPC .................... G21C 3/04; G21C 3/16
See application file for complete search history.

(56) References Cited

U.S. PATENT DOCUMENTS

| | | | | |
|---|---|---|---|---|
| 3,355,358 A | * | 11/1967 | Leslie | G21C 3/36 976/DIG. 82 |
| 3,957,577 A | * | 5/1976 | Treshow | G21C 7/16 376/230 |
| 4,971,753 A | * | 11/1990 | Taylor, Jr. | G21C 3/18 376/416 |
| 5,190,720 A | | 3/1993 | Hunsbedt et al. | |

(Continued)

FOREIGN PATENT DOCUMENTS

WO 2019164617 A2 8/2019
WO WO-2022271433 A9 * 2/2023

OTHER PUBLICATIONS

Won, Jong Hyuck, et al. "Sodium-cooled fast reactor (SFR) fuel assembly design with graphite-moderating rods to reduce the sodium void reactivity coefficient." Nuclear Engineering and Design 280 (2014): 223-232. (Year: 2014).*

(Continued)

*Primary Examiner* — Lily C Garner
(74) *Attorney, Agent, or Firm* — Morgan, Lewis & Bockius LLP

(57) ABSTRACT

Fission reactor has a cladding encasing a heat generating source including a fissionable nuclear fuel composition. The heat generating source is offset from the surface of the cladding and molten metal is located within the void space formed by the offset. As a liquid, the molten metal will flow and occupy any contiguous network of void space within the fuel cavity and provides thermal transfer contact between the heat generating source and the cladding. The cladding separates the heat generating source and the molten metal from the primary coolant volume.

22 Claims, 5 Drawing Sheets

(56) References Cited

U.S. PATENT DOCUMENTS

| | | | | | |
|---|---|---|---|---|---|
| 5,377,246 | A | * | 12/1994 | Taylor, Jr. | ............... G21C 3/18 376/412 |
| 8,363,776 | B2 | * | 1/2013 | Takeda | ................... G21C 5/18 376/444 |
| 11,437,156 | B2 | * | 9/2022 | Russell, II | ............ B22F 10/38 |
| 2009/0207963 | A1 | * | 8/2009 | Van Uitert | ............. G21C 9/00 376/402 |
| 2012/0020446 | A1 | * | 1/2012 | Hyde | ..................... G21D 3/00 376/208 |
| 2014/0226775 | A1 | * | 8/2014 | Devolpi | .................. G21G 1/08 376/189 |
| 2015/0228363 | A1 | * | 8/2015 | Dewan | ................... G21C 1/22 376/458 |
| 2017/0062080 | A1 | * | 3/2017 | Cheatham, III | ........ G21C 3/04 |
| 2020/0027585 | A1 | | 1/2020 | Russell, II et al. | |

OTHER PUBLICATIONS

International Preliminary Report on Patentability in International Application No. PCT/US2020/028615 dated Sep. 28, 2021.
International Search Report and Written Opinion dated Jul. 21, 2020 in PCT/US20/28615.

\* cited by examiner

MOLTEN METAL FUEL BUFFER IN FISSION REACTOR AND METHOD OF MANUFACTURE

RELATED APPLICATION DATA

This application is based on and claims priority under 35 U.S.C. § 119 to U.S. Provisional Application No. 62/836,103, filed Apr. 19, 2019, the entire contents of which are incorporated herein by reference.

TECHNICAL FIELD AND INDUSTRIAL APPLICABILITY

The present disclosure relates generally to fission reactors and structures related to the active reactor space in fission reactors. In particular, a thermal generating structure, such as a fuel element, is encased by and offset from a containment structure, such as cladding, and a molten metal is located in a space formed by the offset and provides enhanced thermal transfer capabilities as well as improved pressure and stress profiles for the structure. The present disclosure is particularly adapted for use in a fission reactor that places fissionable nuclear fuel in the reactor core between and around non-fuel tubes for primary coolant, moderator, control rods, scram rods and/or ancillary equipment.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Traditional fission reactors utilize fissionable nuclear fuel, such as uranium-based fuel, placed inside fuel elements, which are typically round tubes, plates, or hexagon-shaped. These fuel elements are collected and arranged into fuel assemblies, which are the base element of a nuclear reactor core. Conventional fuel assemblies 10 (see FIG. 1A) are complex arrangements of, for example, fuel elements 12 (which contain the fissionable nuclear fuel 14 and burnable poisons), mechanical support for the fuel assembly structure, spacer grids 16 (which ensure a spacing of components and guiding of the fuel elements), and non-fuel tubes for, e.g., control rods 18 or in-core instrumentation 20 and the like. Depending on the design, a reactor vessel may have dozens of fuel assemblies 10 (also known as fuel bundles), each of which may contain 200 or more fuel elements 12.

Within conventional core designs, primary coolant (such as water 40) flows (represented by arrow 30 in FIGS. 1A and 1B) through the fuel assemblies and around the fuel elements 12 and provides both a moderator for the fission reaction (in the case of water-type cooled reactors) and a heat extraction medium for heat generated by fission reaction in the fuel elements.

In alternative core designs (see FIG. 2), fuel elements 50 (which contain the fissionable nuclear fuel and burnable poisons) or more simply the fissionable nuclear fuel and burnable poisons themselves, are arranged within a cladding structure 52 that both forms a barrier between the fuel elements or fuel 50 and the primary coolant, as well as defines the primary coolant flow path 54 (shown in FIG. 2 with moderator elements 56 in the primary coolant channel 54). In such alternative core designs, the fuel assemblies or the fuel 50 are arranged between and around the primary coolant channels 54 and the primary coolant (such as water) flowing through the primary coolant channel 54 provides both a moderator for the fission reaction (in the case of water-type cooled reactors) and a heat extraction medium for heat generated by fission reaction in the fuel elements.

In both the conventional and alternative core designs, the heated primary coolant circulates within a primary cycle (meaning those systems subject to, in contact with or otherwise exposed to the primary coolant) and typically transfers thermal energy to a secondary system, where thermally excited fluid generated by the core and flows to turbines which, in turn, can be used to spin an electric generator.

SUMMARY

Thermal transfer between the fuel elements/fuel in both the conventional and alternative core designs is influenced by the thermal coupling of the heat generating source, i.e., the fissionable nuclear fuel composition, the surrounding cladding, and the primary coolant. However, such thermal coupling can be deleteriously impacted by, for example, design considerations as well as manufacturing limitations. Regarding design considerations, fuel elements are designed to accommodate outgassing, irradiation damage, structural changes due to thermal expansion/contraction, and mechanical stresses, over operational lifetime of the components, which leads one to design spaces between structures to accommodate these phenomena. However, fuel tends to thermally grow into cladding material, causing high stresses; and a simple air gap (to remove the stresses) will produce poor thermal properties, hence the need for a thermal buffer. Regarding manufacturing limitations, manufacturing tolerances, such as spaces or non-perfect mating, can limit the degree of thermal coupling between structures. In high temperature regimes, poor thermal coupling between the fuel and cladding can lead to molten fuel, which is unacceptable.

Thus, it would be advantageous to improve the thermal coupling of the heat generating source, i.e., the fissionable nuclear fuel composition, the cladding, and the primary coolant in order to improve thermal efficiency and/or to provide more precise thermal management of the fission reactor, including during abnormally high temperature events.

In general, the disclosure is directed to a fission reactor in which a heat generating source (including a fissionable nuclear fuel composition) is offset from cladding, which separates the heat generating source from the primary coolant volume forming a void space, where a molten metal occupies the void space. The molten metal in the void space provides a thermal conduction pathway between the fissionable nuclear fuel composition and the cladding, and acts as a secondary coolant (due to its thermal conduction capacity), generating a flexible housing (i.e., a buffer) for the fissionable nuclear fuel composition. For example, offsetting the fuel element from the cladding and filling the void space with molten metal can reduce or remove stresses caused by a thermal expansion (CTE) differential between intimately contacted fuel and cladding, fine tolerance requirements, and unpredictability in thermal conductivity arising from the cladding and heat generating source. The disclosed molten metal fuel buffer technique takes advantage of the high thermal conductivity of the molten metal for heat transfer from the heat generating source to the cladding (and ultimately to the primary coolant), but does not use the molten metal as the primary coolant.

Embodiments disclosed herein include a fission reactor comprising a heat generating source including a fissionable nuclear fuel composition, a primary coolant volume through which a primary coolant is flowable during operation of the fission reactor, a cladding encasing the heat generating source, wherein the cladding has a first side oriented toward the heat generating source and a second side oriented toward the primary coolant volume and wherein at least a portion of the cladding separates the heat generating source from the primary coolant volume, and a molten metal in thermal transfer contact with the heat generating source and the first side of the cladding.

Embodiments disclosed herein also include a method of manufacturing a fission reactor with a molten metal fuel buffer, the method comprising manufacturing a cladding structure defining an initial fuel cavity having an opening, loading molten metal and a heat generating source including the fissionable nuclear fuel composition into the initial fuel cavity via the opening while maintaining an expansion volume, and sealing the opening to form an assembled fuel cavity. The cladding has a first side oriented toward the heat generating source and a second side oriented toward a primary coolant volume of the fission reactor and the cladding separates the molten metal from the primary coolant volume. At an operating temperature, the molten metal is in thermal transfer contact with the heat generating source and the first side of the cladding.

Embodiments disclosed herein also include a method of manufacturing a fission reactor with a molten metal fuel buffer, the method comprising manufacturing a cladding structure and a heat generating source including a fissionable nuclear fuel composition with an additive manufacturing process, wherein the cladding structure defines an initial fuel cavity and the heat generating source is located with the initial fuel cavity, loading molten metal into the initial fuel cavity while maintaining an expansion volume, and sealing the loaded initial fuel cavity with an additive manufacturing process to form an assembled fuel cavity. The cladding has a first side oriented toward the heat generating source and a second side oriented toward a primary coolant volume of the fission reactor and the cladding separates the molten metal from the primary coolant volume. At an operating temperature, the molten metal is in thermal transfer contact with the heat generating source and the first side of the cladding.

Additionally, although the disclosed reactor and core have complex mechanical geometries, integral and iterative manufacturing on a layer-by-layer basis using additive manufacturing techniques, such as 3D printing, of elemental metal or metal alloys enables the structure and features disclosed herein to be more easily manufactured. Symbiotically, a molten metal buffer also makes additive manufacturing more amenable as fine manufacturing tolerances between complex fuel and cladding (to retain quality thermal coupling) can be difficult to achieve.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

DETAILED DESCRIPTION

Embodiments of disclosed fission reactors comprise a heat generating source including a fissionable nuclear fuel composition, a primary coolant volume through which a primary coolant is flowable during operation of the fission reactor, and cladding encasing the heat generating source having a first side oriented toward the heat generating source and a second side oriented toward the primary coolant volume. The cladding encasing the heat generating source defines a fuel cavity in which the fissionable nuclear fuel composition is located. The fuel cavity is a closed volume and the cladding (or at least a portion of the cladding) separates the heat generating source from the primary coolant volume.

Disclosed embodiments of the fission reactor further include a molten metal in thermal transfer contact with the heat generating source and the first side of the cladding. The molten metal occupies at least a portion of a void space between the heat generating source and the first side of the cladding. However, the molten metal may navigate towards the center of the heat generating source in the event of cracking or degradation. Considering that a lack of contact, i.e., an offset or void space, between the heat generating source and the first side of the cladding would cause a reduction in thermal conductivity, the presence of molten metal in the void space provides thermal transfer contact between the heat generating source and the first side of the cladding.

Figure 3A:
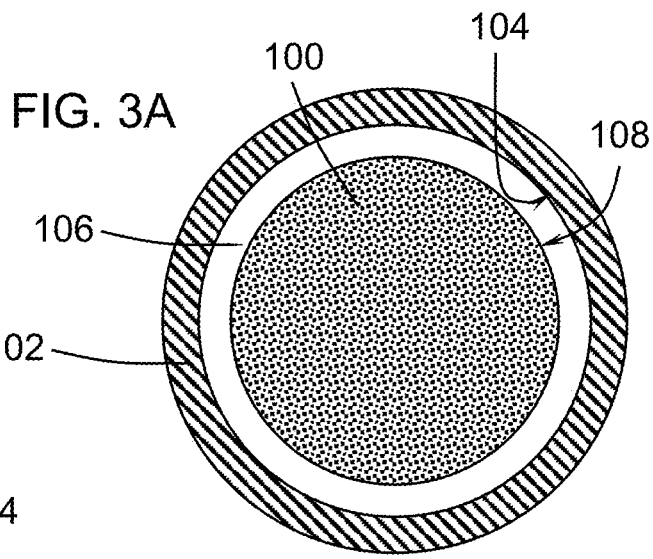
FIGS. 3A-3C schematically illustrate, for an example fission reactor in which the primary coolant flows through the assembly and around the cladding containing the heat generating source, fuel rod cross sections with different variants of the void space in which the molten metal is located to improve thermal coupling.
Figure 3B:
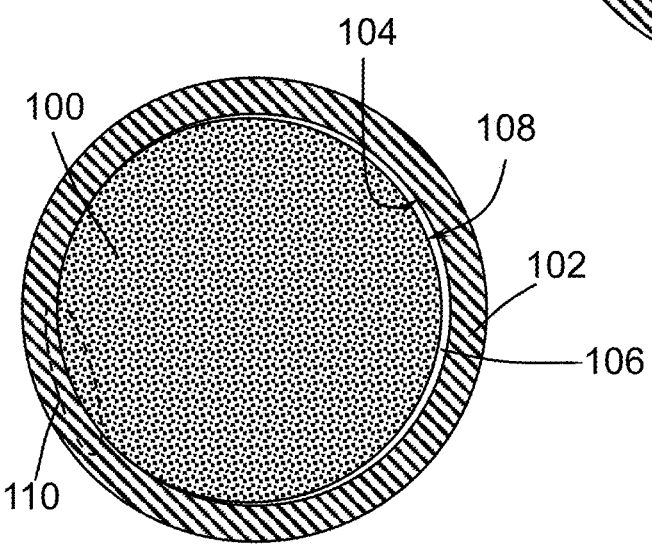
Figure 3C:
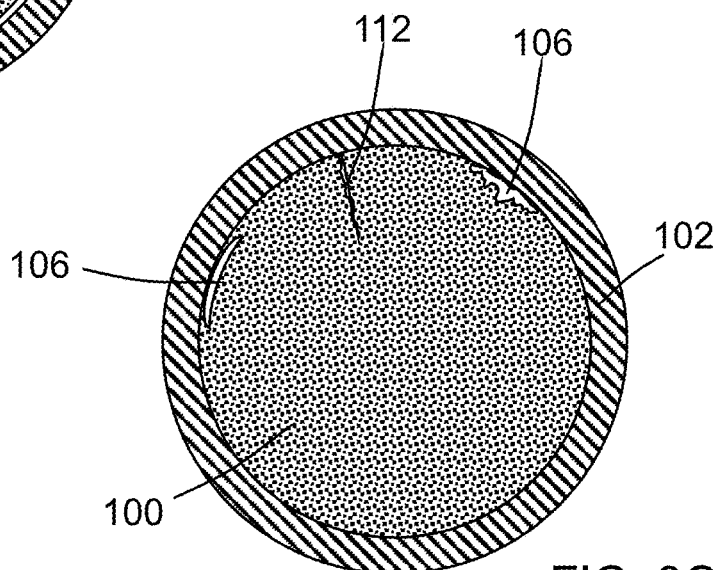

Providing thermal transfer contact between the heat generating source and the first side of the cladding with a molten metal in the void space formed by the offset can be adapted to any of various geometric arrangements of fission reactors. In one example, the fission reactor operates with primary coolant that flows through the assembly and around the cladding containing the heat generating source. In such fission reactors, there are different variants of the void space between the heat generating source and the cladding in which the molten metal is located. FIGS. 3A-3C show example embodiments of these variants.

In some embodiments, the void space is formed as a result of offsetting the heat generating source from the cladding.

FIG. 3A is a schematic of an axial cross-section of a fuel element, i.e., a cross-section in a plane perpendicular to the longitudinal axis of the fuel element, and illustrates an example of such an offset and the resulting void space. In FIG. 3A, the heat generating source 100, which includes a fissionable nuclear fuel composition, is encased within a cladding 102. Offsetting occurs where the dimensions/volume of the heat generating source 100 are less than the dimensions/volume of the inner surface 104 of the cladding 102, which creates a void space 106 between an outer surface 108 of the heat generating source 100 and a surface of the cladding 102 oriented toward the heat generating source 100, e.g., the inner surface 104 of the cladding 102.

The void space 106 mitigates stresses that can arise due to differences in the coefficient of thermal expansion (CTE) between the materials in any one structure as well as between materials in different, but in-contact structures, including the cladding material and the fissionable nuclear fuel composition by forming space for growth without intimate contact. Additionally, the void space 106 accommodates any manufacturing variations in the dimensions of components and reduces fine tolerance requirements. Also, the void space 106 provides a volume to contain or accommodate any reaction products, such as fission gas formation and associated swelling of the heat generating source 100.

Depending on the size of the offset, i.e., the differential between the outer surface 108 of the heat generating source 100 and the inner surface 104 of the cladding 102, the void space 106 is either larger or smaller, and the void space can vary from being present at the entire periphery of the heat generating surface (such as shown in FIG. 3A) to being present at a portion of the periphery of the heat generating source (such as shown in FIG. 3B). When a void space 106 is present at the entire periphery of the heat generating source 100 (such as shown in FIG. 3A), the heat generating source 100 is not attached to, or otherwise in contact with, the cladding 102 and effectively floats in the fuel cavity. When a void space 106 is present only at a portion of the periphery of the heat generating source 100 (such as shown in FIG. 3B), at least a portion of the heat generating source 100 can be in thermal transfer contact with the cladding 102. An example of such thermal transfer contact between the heat generating source 100 and the cladding 102 is illustrated in region 110 in FIG. 3B.

In further embodiments, the void space 106 can be a result of a defect, such as a chip, a pit, or a flat or convexity/concavity in the surface, in one or more of the heat generating source 100 or the cladding 102. FIG. 3C illustrates examples of such a void space 106 within the surface of the heat generating source 100 (analogous defects can be present within the inner surface 104 of the cladding 102). Furthermore, in operation, the heat generating source 100 can crack 112, for example, due to fission gas formation and natural fuel degradation. Molten metal can penetrate such a crack 112 and can improve the thermal transfer between the sides of the heat generating source 100 separated by the crack 112 as well as with the cladding 102. As a liquid, the molten metal will flow and occupy any contiguous network of void space within the fuel cavity (in which case, void space 106 illustrates void space/molten metal 106), preventing intra-fuel peak temperature phenomena. Other purposeful cavities or voids, for example that are associated with the structure of the fuel having an open structure, such as a gyroid or lattes, could also be occupied by the molten material.

Any one or more of the above variants can be present in combination and the molten metal can bridge any of the thermal gaps from void spaces between the metal cladding and the fissionable nuclear fuel composition as well as any thermal gaps, such as cracks, arising in the fissionable nuclear fuel composition itself.

Figure 1A:
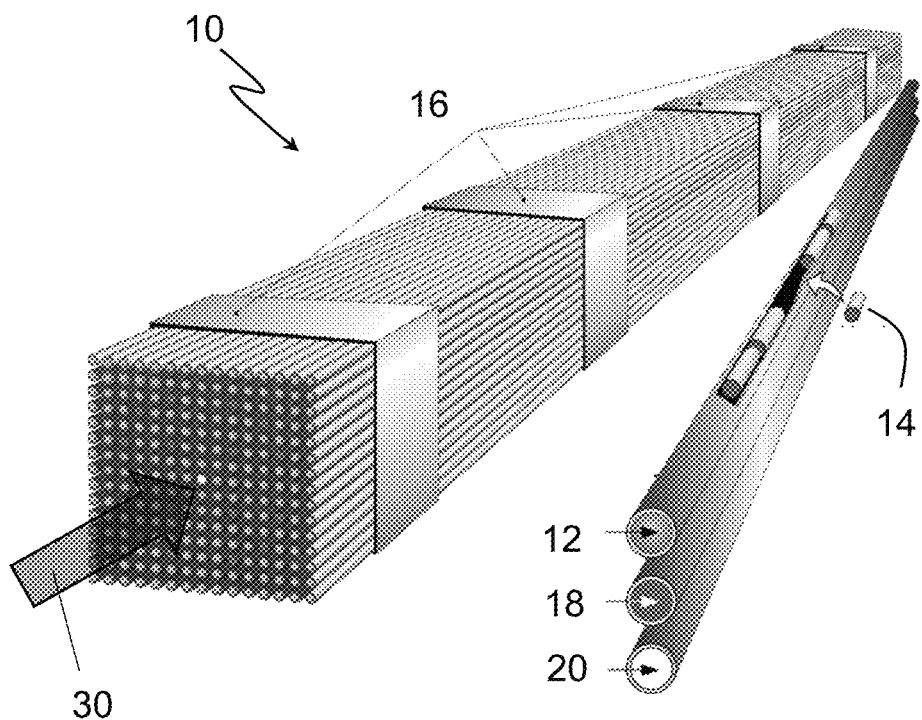
FIG. 1A shows a conventional fuel assembly with fuel elements comprising rods of fissionable nuclear fuel and non-fuel tubes and in which primary coolant flows through the assembly and around individual tubes.
Figure 1B:
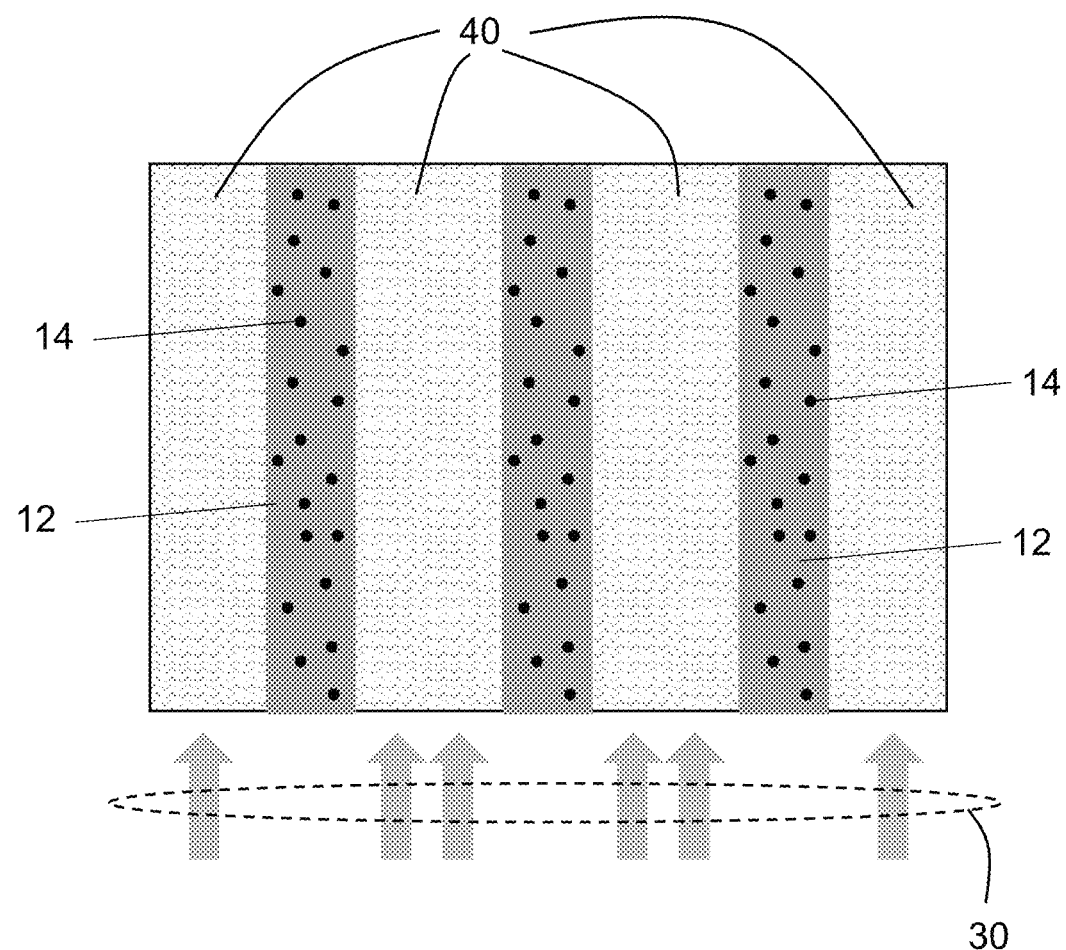
FIG. 1B illustrates, in a magnified schematic, an example of the flow of primary coolant in a portion of a conventional fuel assembly.
Figure 2:
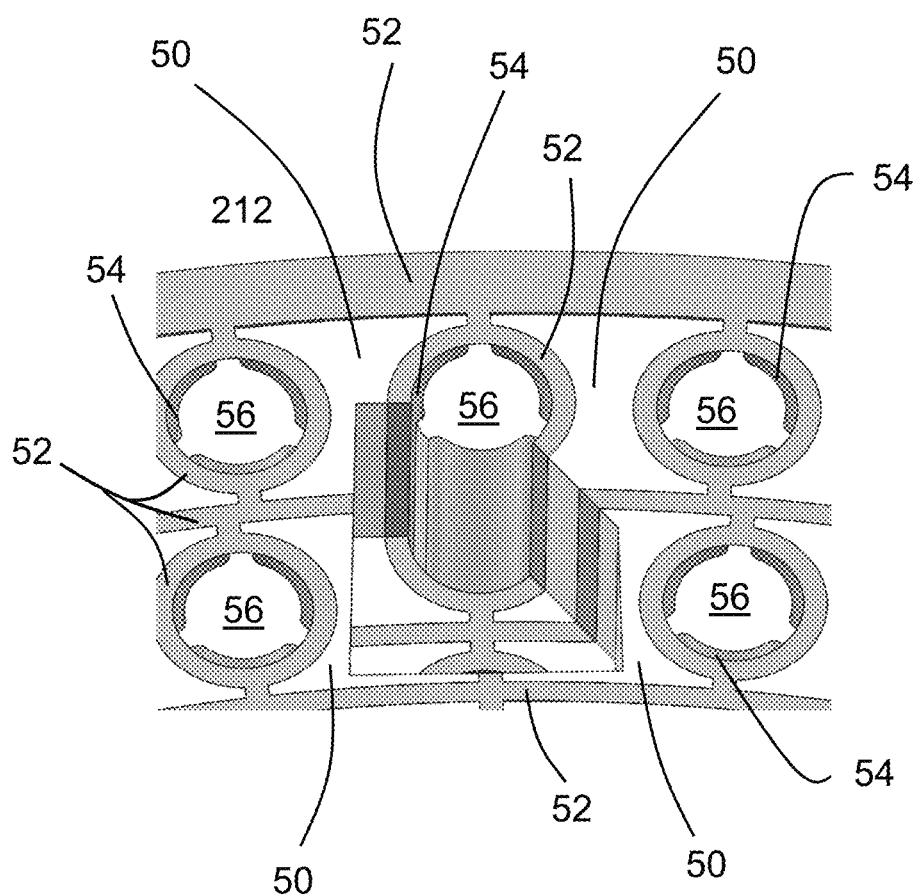
FIG. 2 shows a perspective, radial cross-sectional and axial cut-away view of a portion of an alternative core design in which the cladding forms a primary coolant volume through which the primary coolant flows during operation of the fission reactor.
Figure 4A:
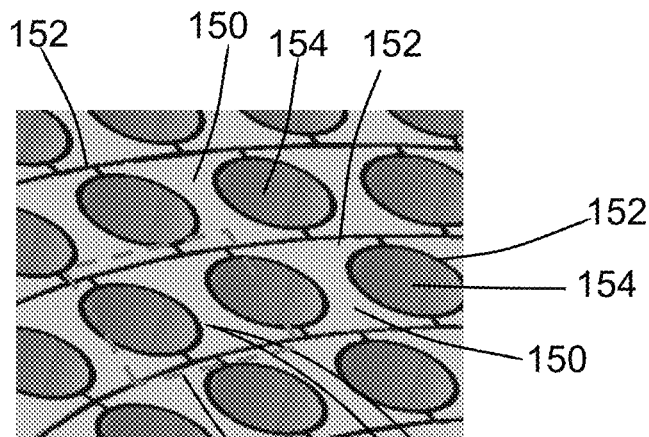
FIGS. 4A and 4B schematically illustrate, for an example fission reactor in which the primary coolant flows through a primary coolant volume formed by the cladding, a portion of an example variant of the void space in which the molten metal is located in an alternative nuclear core, such as, for example, that shown and described herein.
Figure 4B:
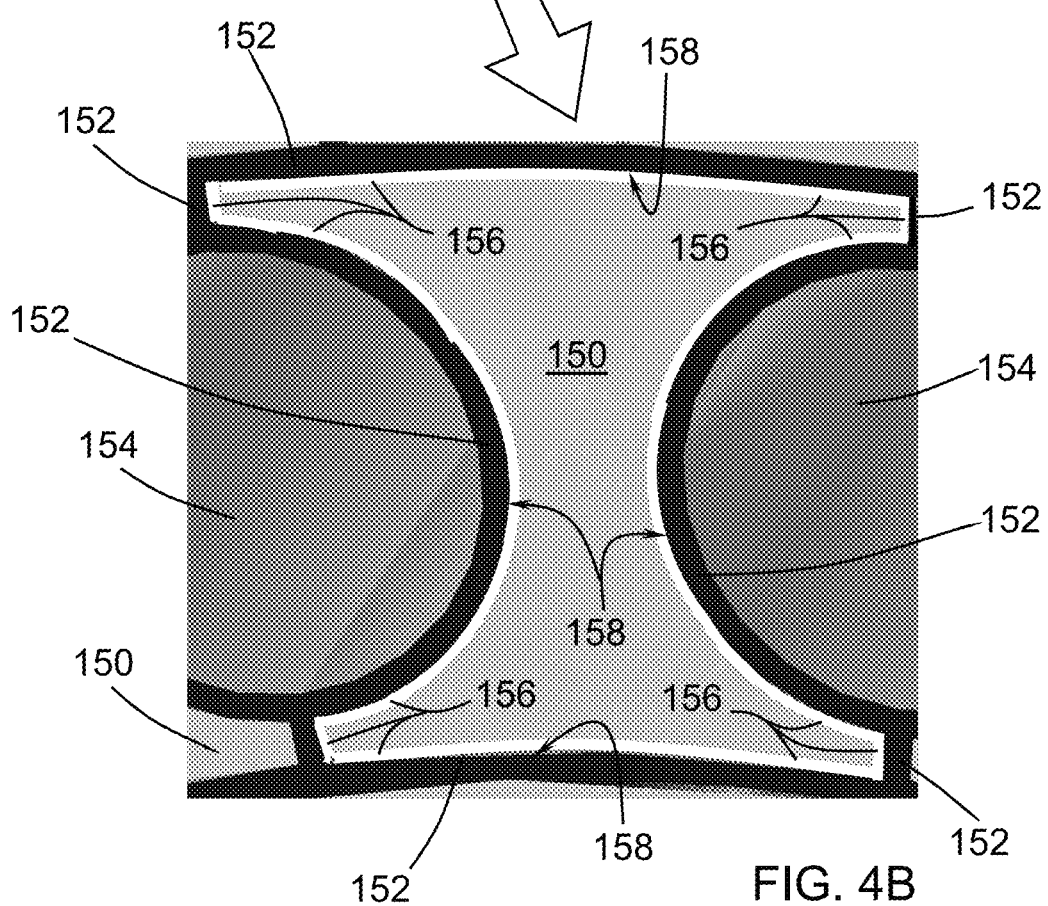

In another example, the fission reactor includes fuel assemblies or a fissionable nuclear fuel composition that is arranged between and around the primary coolant volume though which the primary coolant flows during operation of the fission reactor. Primary coolant flow path 54 in FIG. 2 is an example of such a primary coolant volume. In such fission reactors, there are different variants of the void space between the heat generating source and the cladding in which the molten metal is located. FIGS. 4A-4B show an example embodiment of this variant.

In some embodiments, the void space is formed as a result of offsetting the heat generating source from the cladding to account for manufacturing tolerance and assembly fit-up. FIG. 4A is schematic perspective view of a portion of a fission reactor illustrating fuel elements 150 (which contain the fissionable nuclear fuel composition) or more simply the fissionable nuclear fuel composition itself, arranged within a cladding structure 152 that defines a primary coolant volume 154 through which a primary coolant flows during operation (by enclosing a volume in which primary coolant flows), defines a fuel cavity (by enclosing a volume encasing the heat generating source), as well as forms a barrier between the fuel elements or fissionable nuclear fuel composition 150 and the primary coolant (when present in the primary coolant volume 154). FIG. 4B (which is a magnified portion of region 160 of FIG. 4A) is a schematic of an axial cross-section, i.e., a cross-section in a plane perpendicular to the longitudinal axis of the fuel element, and illustrates an example of a fuel element and encasing cladding and associated primary coolant volume and illustrating an example of an offset and the resulting void space. As shown in FIGS. 4A and 4B, the fuel assemblies or the fissionable nuclear fuel composition 150, i.e., the heat generating source, are arranged between and around the primary coolant volume 154. The heat generating source is encased within the cladding 152 and the primary coolant (such as water) flows through the primary coolant volume 154 to provide both a moderator for the fission reaction (depending on the reactor type) and a heat extraction medium for heat generated by a fission reaction in fuel elements or fissionable nuclear fuel composition 150. i.e., the heat generating source.

As seen in FIG. 4B, a void space 156 is formed at the periphery of the heat generating source as a result of offsetting the fuel assemblies or the fissionable nuclear fuel composition 150, i.e., the heat generating source, from the cladding 152. Offsetting occurs where the dimensions/volume of the fuel assemblies or the fissionable nuclear fuel composition 150, i.e., the heat generating source, are less than the dimensions/volume of a surface 158 of the cladding 152 oriented toward the heat generating source, which creates a void space 156 between a surface of the fuel assemblies or the fissionable nuclear fuel composition 150, i.e., the heat generating source, and a surface of the cladding 152 oriented toward the heating source, e.g., the outer surface 158 of the cladding 152.

The void space 156 mitigates stresses that can arise due to differences in the coefficient of thermal expansion (CTE) between the materials in any one structure as well as between materials in different, but in-contact structures, including the cladding material and the fissionable nuclear fuel composition by forming space for growth without intimate contact. Additionally, the void space 156 accommodates any manufacturing variations in the dimensions of components and reduces fine tolerance requirements. Also, the void space 156 provides a volume to contain or accommodate any reaction products, such as fission gas formation and associated swelling of the fuel assemblies or the fissionable nuclear fuel composition 150, i.e., the heat generating source.

Depending on the size of the offset, i.e., the differential between the outer surface of the fuel assemblies or the fissionable nuclear fuel composition 150, i.e., the heat generating source, and the surface 158 of the cladding 152 oriented toward the heating source, the void space 156 is either larger or smaller, and the void space can vary from being present at the entire periphery of the heat generating surface (such as shown in FIG. 4B) to being present at a portion of the periphery of the heat generating source. When a void space 156 is present at the entire periphery of the heat generating source (such as shown in FIG. 4B), the heat generating source is not attached to, or otherwise in contact with, the cladding and effectively floats in the fuel cavity. When a void space 156 is present only at a portion of the periphery of the heat generating source, at least a portion of the fuel assemblies or the fissionable nuclear fuel composition 150, i.e., the heat generating source, can be in thermal transfer contact with the cladding 152.

Similar to the embodiments in FIGS. 3A-3C, the embodiment in FIGS. 4A-4B can have one or more void spaces 156 that are a result of a defect, such as a chip, a pit, or a flat or convexity/concavity in the surface, in one or more of the fuel assemblies or the fissionable nuclear fuel composition 150, i.e., the heat generating source, or the cladding 152. Furthermore, in operation, the fuel assemblies or the fissionable nuclear fuel composition 150, i.e., the heat generating source, can crack, for example, due to fission gas formation or natural degradation. Molten metal can penetrate such a crack and can improve the thermal transfer between the sides of the heat generating source separated by the crack and cracks, as well as with the cladding 152. As a liquid, the molten metal will flow and occupy any contiguous network of void space within the fuel cavity (in which case, void space 156 illustrates void space/molten metal 156).

The offset in the various embodiments disclosed herein can be any suitable size. In some embodiments, the offset is 0.005 to 0.01 inches (0.127 to 0.254 mm). In terms of volume, the volume of the heat generating source is 2% to 10% smaller, alternatively, 5% to 8% smaller, than the volume of the fuel cavity, which provides for a void space within the fuel cavity that can accommodate the molten metal. For example, on a volume basis relative to the volume of the fuel cavity, the heat generating source can occupy 92% to 93% of the volume of the fuel cavity and the molten metal can occupy 5% of the volume of the fuel cavity. The balance of the volume of the fuel cavity is left empty to allow for an expansion volume to accommodate (a) thermal expansion of the cladding forming the fuel cavity, the heat generating source, and the molten metal, and (b) fission gas release. The differences in the coefficient of thermal expansion for the various materials as well as the anticipated fission gas release and the effects at operational temperatures can be used to calculate the volume of molten metal required at room temperature assembly.

A suitable fissionable nuclear fuel composition applicable to the disclosed fission reactor and to be included in the heat generating source includes uranium oxide that is less than 20% enriched, uranium with 10 wt. % molybdenum (U-10Mo), uranium nitride (UN), and other stable fissionable fuel compounds. Burnable poisons may also be included. Typically, the fissionable nuclear fuel composition is in the form of a ceramic material.

Suitable molten metals for inclusion in the disclosed fission reactor and to be included in the fuel cavity include sodium (Na), sodium-potassium (NaK), potassium (K), iron (Fe), copper (Cu), lead-bismuth (Pb—Bi), tin-lead (Sn—Pb), and tin (Sn). Different metals and alloys can be suitably used depending on the cladding/fuel combination.

When either the fuel cavity (such as in FIGS. 3A-C) or the primary coolant volume (such as in FIGS. 4A-B) are embodied in the shape of a tube, the tube is generally oriented within the fission reactor with a longitudinal axis is parallel to a longitudinal axis of the fission reactor. Further, the tube can have any suitable cross-sectional shape (in an axial cross-section relative to the longitudinal axis of the fission reactor), although typically the cladding forming the walls of the tube has a shape of a circle or a hexagon. Example shapes of the cladding encasing the heat generating source include the shape of a cross-section of a hyperboloid of one sheet, the shape of a cross-section of a circle, the shape of cross-section of a hexagon, or the shape of an annular cross-section.

The molten metal fuel buffers disclosed herein can be manufactured by any suitable process. In a first manufacturing process, the cladding structure defining the fuel cavity is manufactured by metallurgical processes. The cladding structure is initially manufactured to a point where an opening remains in the fuel cavity, i.e., an initial fuel cavity such as a tube having side walls and one closed end. The initial fuel cavity is then loaded with the molten metal and the heat generating source, including the fissionable nuclear fuel composition. For example, a volume of molten metal is placed into the initial fuel cavity (e.g., via the open end of the tube) followed by the heat generating source (or vice versa). If liquid under the manufacturing conditions, the molten metal can be poured into the initial fuel cavity; if solid under the manufacturing conditions, suitable shaped piece(s) of the molten metal can be placed into the initial fuel cavity (suitable shaped to conform to the fuel cavity geometry and the heat generating source geometry). As previously noted, an expansion volume remains unoccupied. Once the initial fuel cavity is loaded, an end cap is placed over the opening and is sealed, for example, by welding or by a hot isostatic pressing (HIP) process, to form the assembled fuel cavity.

In a second manufacturing process, features of the fission reactor are manufactured as an integral, unitary structure using, for example, an additive manufacturing process. An example of a suitable additive manufacturing process utilizes 3-D printing of a metal alloy, such as a molybdenum-containing metal alloy, Zircaloy-4 or Hastelloy X, to form the noted cladding structural features. In other embodiments, the fissionable nuclear fuel composition and/or the molten metal can be included within the integral, unitary structure when suitable multi-material, additive manufacturing processes with multiple metals within the feedstock are employed. If the molten metal is not included in the additive manufacturing process, the additive manufacturing process can be paused, a volume of molten metal placed into the fuel cavity (either in liquid or solid form) and the additive manufacturing process continued to complete the structure of the closed, assembled fuel cavity. Other alloys that can be used when suitable multi-material, additive manufacturing processes with multiple metals within the feedstock are employed include: steel alloys, zirconium alloys, and Molybdenum-Tungsten alloys (for the shell of the reactor core); beryllium alloys (for the reflector); and stainless steel (for the containment housing).

Additive manufacturing techniques for the manufacture of the integral and unitary structure for the fission reactors and assembled fuel cavities disclosed herein can include the additional steps of: (a) predictive and causal analytics, (b) in-situ monitoring combined with machine vision and accelerated processing during the layer-by-layer fabrication of the structure, (c) automated analysis combined with a machine learning component, and (d) virtual inspection of a digital representation of the as-built structure. In addition, additive manufacturing technology can create complex geometries and, when coupled with in-situ sensors, machine vision imagery, and artificial intelligence, allows for tuning of the manufacturing quality as the components are built on a layer-by-layer additive basis (often, these layers are on the scale of 50 microns) and provides predictive quality assurance for the manufacture of such reactors and structures.

It is contemplated that various supporting and ancillary equipment can be incorporated into the disclosed fission reactor. For example, at least one of a moderator, such as a zirconium hydride neutron moderator, a control rod, such as iridium control rod, and a scientific instrument, such as a temperature sensor or radiation detector, can be incorporated into the fission reactor. Additionally, the control rods can also incorporate a neutron poison which absorbs neutrons and can be used to regulate the criticality of nuclear reactors. The neutron poison can absorb enough neutrons to shut down the fission reactor (e.g., when the control rods are completely inserted into the reactor space) or can be axially positioned to maintain criticality of the fission reactor (e.g., when the control rods are withdrawn from the reactor core a distance to allow a continuous fission chain reaction). Any suitable number of control rods and moderators can be used and suitably distributed throughout the reactor space in order to obtain one or more of a desired flux profile, power distribution, and operating profile. In exemplary embodiments, the control rods are threaded, which contribute to save axial space, maximizes control rod diameter, and allows for direct roller nut contact for reliable SCRAM operation. All or a subset of control rods can be individually controlled by independent motors to provide discrete reactivity control and/or for power shaping.

The disclosed arrangements—in which the molten metal enclosed in the fuel cavity is separated from the primary coolant and bridges thermal gaps in the heat transfer path from heat generating source to cladding—pertains to any configuration in which a heat generating source including a fissionable nuclear fuel composition, whether a fuel element or the fissionable nuclear fuel composition per se, is surrounded by cladding. Although generally described herein in connection with a pressurized water reactor (PWR reactors) and with water as a primary coolant, the structures and methods disclosed herein can also be applicable to other reactor systems. This includes boiling water reactors (BWR reactors), deuterium oxide (heavy water) moderator reactors such as CANDU reactors, light water reactors (LWR reactors), pebble bed reactors (PBR reactors), nuclear thermal propulsion reactors (NTP reactors), both commercial and research reactors, and utilize other primary coolants, such as helium, hydrogen, methane, carbon dioxide, molten salts, and liquid metals. Any fuel-to-clad configuration in these various reactors may produce better nuclear core safety and performance characteristics if the molten metal fuel buffer technique disclosed herein is utilized.

Fission reactors disclosed herein can be used in suitable applications including, but not limited to, terrestrial power sources, remote power or off-grid applications, space power, space propulsion, isotope production, directed energy applications, commercial power applications, and desalination.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A fission reactor, comprising:
a plurality of heat generating sources, wherein each of the heat generating sources includes a fissionable nuclear fuel composition;
a plurality of primary coolant volumes through which a primary coolant is flowable during operation of the fission reactor;
a cladding encasing each of the plurality of heat generating sources; and
a molten metal,
wherein, for each of the plurality of heat generating sources:
the cladding has a first side oriented toward the heat generating source,
the cladding has a second side including a first portion oriented toward a first primary coolant volume and a second portion oriented toward a second primary coolant volume, and
the molten metal is in thermal transfer contact with the heat generating source and the first side of the cladding, and
wherein, in a cross-section perpendicular to a longitudinal axis of the fission reactor, the cladding encasing each of the plurality of heat generating sources has a shape of a cross-section of a hyperboloid of one sheet.

2. The fission reactor according to claim 1, wherein, for each of the plurality of heat generating sources, a space is between the heat generating source and the first side of the cladding, and wherein the molten metal occupies at least a portion of the space.

3. The fission reactor according to claim 2, wherein the space is located at a portion of a periphery of the heat generating source.

4. The fission reactor according to claim 2, wherein the space is located at an entire periphery of the heat generating source.

5. The fission reactor according to claim 2, wherein the space is located at a portion of a periphery of the heat generating source and wherein at least a portion of the heat generating source is in thermal transfer contact with the cladding.

6. The fission reactor according to claim 1, wherein, in the cross-section perpendicular to the longitudinal axis of the fission reactor:
the cladding encasing each of the plurality of heat generating sources has an encasing length, and
a length of the cladding containing the first portion of the second side and a length of the cladding containing the second portion of the second side are less than the encasing length.

7. The fission reactor according to claim 6, wherein, in the cross section, the shape of each of the primary coolant volumes is defined by the first portion of the second side of the cladding and the second portion of the second side of the cladding.

8. The fission reactor according to claim 7, wherein in the cross section, a longitudinal axis of each of the plurality of the primary coolant volumes is parallel to the longitudinal axis of the fission reactor.

9. The fission reactor according to claim 8, wherein, in the cross section, the shape of each of the primary coolant volumes is a circle.

10. The fission reactor according to claim 5, wherein the molten metal is sodium (Na), sodium-potassium (NaK), potassium (K), iron (Fe), copper (Cu), lead-bismuth (Pb—Bi), tin-lead (Sn—Pb), or tin (Sn).

11. The fission reactor according to claim 10, wherein at least the heat generating source and the cladding are an integral, unitary structure.

12. The fission reactor according to claim 1, wherein the cladding containing the first portion and the second portion separates the molten metal from the primary coolant.

13. The fission reactor according to claim 1, wherein, in a cross-section perpendicular to a longitudinal axis of the fission reactor, a shape of each of the primary coolant volumes is at least partially defined by the first portion of the second side of the cladding and the second portion of the second side of the cladding.

14. The fission reactor according to claim 13, wherein the shape of each of the primary coolant volumes is a circle.

15. The fission reactor according to claim 14, wherein a longitudinal axis of each of the plurality of the primary coolant volumes is parallel to the longitudinal axis of the fission reactor.

16. The fission reactor according to claim 1, wherein the molten metal is sodium (Na), sodium-potassium (NaK), potassium (K), iron (Fe), copper (Cu), lead-bismuth (Pb—Bi), tin-lead (Sn—Pb), or tin (Sn).

17. The fission reactor according to claim 1, wherein at least the heat generating source and the cladding are an integral, unitary structure.

18. The fission reactor according to claim 2, wherein a first heat generating source of the plurality of heat generating sources is adjacent a second heat generating source of the plurality of heat generating sources, and wherein the first primary coolant volume of the plurality of primary coolant volumes occupies a flow space defined by the first portion of the second side of the cladding of the first heat generating source and the second portion of the second side of the cladding of the second heat generating source.

19. The fission reactor according to claim 18, wherein, in the cross-section perpendicular to the longitudinal axis of the fission reactor, a shape of the flow space is a circle.

20. The fission reactor according to claim 19, wherein a space is between the heat generating source and the first side of the cladding, and wherein the molten metal occupies at least a portion of the space.

21. The fission reactor according to claim 20, wherein the space is located at a first portion of a periphery of the heat generating source, and wherein at least a second portion of the heat generating source is in thermal transfer contact with the cladding.

22. The fission reactor according to claim 21, wherein the molten metal is sodium (Na), sodium-potassium (NaK), potassium (K), iron (Fe), copper (Cu), lead-bismuth (Pb—Bi), tin-lead (Sn—Pb), or tin (Sn).

* * * * *